(12) United States Patent
Sediq

(10) Patent No.: US 8,360,837 B2
(45) Date of Patent: Jan. 29, 2013

(54) SYSTEM AND METHOD FOR FANTASY MIXED MARTIAL ARTS GAME

(76) Inventor: Qais Jamal Sediq, Torrance, CA (US)

( * ) Notice: Subject to any disclaimer, the term of this patent is extended or adjusted under 35 U.S.C. 154(b) by 336 days.

(21) Appl. No.: 12/870,786

(22) Filed: Aug. 28, 2010

(65) Prior Publication Data

US 2011/0111815 A1     May 12, 2011

Related U.S. Application Data

(60) Provisional application No. 61/293,644, filed on Jan. 9, 2010, provisional application No. 61/260,178, filed on Nov. 11, 2009.

(51) Int. Cl.
*A63F 13/00* (2006.01)
(52) U.S. Cl. .......................................... 463/8
(58) Field of Classification Search ................. 463/8
See application file for complete search history.

(56) References Cited

PUBLICATIONS

Author Unknown, "MMA Fantasy Pool," www.facebook.com, downloaded Dec. 9, 2010 URL: http://www.facebook.com/apps/application.php?id=2572232804.

Dulcinea Media, Inc., "Mixed Martial Arts: These Web Sites Will Knock You Out," www.findingdulcinea.com, downloaded Dec. 9, 2010 URL: http://www.findingdulcinea.com/guides/Sports/Mixed-Martial-Arts.pg_02.html#02.

MMAGAME.COM, "MMA Game Fantasy MMA Betting Game," www.mmagame.com, downloaded Dec. 9, 2010 URL: http://www.mmagame.com/.

*Primary Examiner* — Peter DungBa Vo
*Assistant Examiner* — Jeffrey Wong
(74) *Attorney, Agent, or Firm* — Scott R. Hansen; Fulwider Patton LLP

(57) ABSTRACT

Embodiments for a system and method for establishing a plurality of MMA fantasy leagues to a plurality of participants utilizing an automated web-based platform are disclosed. In each embodiment, participants register into the web-based platform in order to create or join a fantasy league organized to play an MMA fantasy fighter game in accordance with game rules, including scoring metrics based on the outcomes of real-world MMA fight events; holding period, transactional (add/drop), or fight quantity restrictions; a predefined course of time; and a predefined method of victory. Participants can draft fighters from real-world MMA fighters to create fantasy teams. Depending on embodiment, league winners may be determined by total points scored throughout the season or just during a final playoff period.

45 Claims, 12 Drawing Sheets

30

MAGNUS ⓜ WARRIOR    | Login | Join |
12    14    16    The Fantasy Fighter Game
                                                                   24    22

Home   Leagues   Upcoming Events   Prizes   Draft kit   Rules & Strategy

Leagues                                                                                               18       20

New Leagues Start Monthly- Sign Up Now
Create a Private League with your friends or join one of the Public Leagues listed below. Note that the draft date is automatically pushed back by one week for any Public League that is not full by 72 hours prior to the draft.

[ Create Private League ]—32

| Premium Leagues- | | Complete with others to win Prizes | | |
|---|---|---|---|---|
| League | Draft Date | Start Date | Teams Available | |
| 15683 Playoff | June 28. 2010 | July 1,2010 | 7 | JOIN |
| 15684 Playoff | July 5. 2010 | Aug 1,2010 | 8 | JOIN |
| 39281 Total Points | July 12. 2010 | Aug 1,2010 | 4 | JOIN |
| 39282 Total Points | July 19. 2010 | Aug 1,2010 | 4 | JOIN |
| 39283 Total Points | July 26. 2010 | Aug 1,2010 | 4 | JOIN |
| View All Premium Leagues | | | | |

| Standard Leagues- | | Play for fun and bragging rights: no prizes awarded | | |
|---|---|---|---|---|
| League | Draft Date | Start Date | Teams Available | |
| 15683 Playoff | June 28. 2010 | July 1,2010 | 7 | JOIN |
| 15684 Playoff | July 5. 2010 | Aug 1,2010 | 8 | JOIN |
| 39281 Total Points | July 12. 2010 | Aug 1,2010 | 8 | JOIN |
| 39282 Total Points | July 19. 2010 | Aug 1,2010 | 8 | JOIN |
| 39283 Total Points | July 26. 2010 | Aug 1,2010 | 4 | JOIN |
| View All Standard Leagues | | | | |

| Trial Leagues | | Play a one-month autodraft version of the game | | |
|---|---|---|---|---|
| League | Draft Date | Start Date | Teams Available | |
| 15683 Playoff | June 28. 2010 | July 1,2010 | 7 | JOIN |
| 15684 Playoff | July 5. 2010 | Aug 1,2010 | 8 | JOIN |
| 39281 Total Points | July 12. 2010 | Aug 1,2010 | 8 | JOIN |
| 39282 Total Points | July 19. 2010 | Aug 1,2010 | 8 | JOIN |
| 39283 Total Points | July 26. 2010 | Aug 1,2010 | 4 | JOIN |
| View All Trial Leagues | | | | |

*Logo*    42    44    46    48    50    52      Home My Profile Help Logout

Dashboard   League   My Team   Fighters   Upcoming Events   Results   Draft     Join New League Invite Friends

League Homepage

Standings

| Rk | Team | Points Q1 Mar-May | Q2 Jun-Aug | Q3 Sep-Nov | Total Q1-Q3 | Playoff Q4 Dec-Feb | Waiver Priority | Grudge Matches | Contract Exemptions Used |
|---|---|---|---|---|---|---|---|---|---|
| | | | | | | | | 68 | 70 |
| Playoff Pool | | | | | | | | | |
| 1 | Superheros* | 101.00 | 63.00 | 121.00 | 285.00 | 98.00* | 3 | 2 | 1 |
| 2 | TMNT | 137.00 | 147.00 | 71.00 | 355.00 | 79.00 | 7 | 1 | 3 |
| 3 | Boss Rutten | 120.00 | 103.00 | 98.00 | 321.00 | 74.00 | 2 | 1 | 0 |
| 4 | George Without on 'S' | 169.00 | 49.00 | 42.00 | 260.00 | 71.00 | 6 | 3 | 1 |
| Consolation Pool | | | | | | | | | |
| 5 | Brooklyn Bonners | 115.50 | 64.00 | 101.00 | 280.50 | 101.00 | 1 | 0 | 1 |
| 6 | Charity Team | 97.00 | 41.00 | 74.00 | 212.00 | 64.00 | 8 | 1 | 0 |
| 7 | Junior Achievement | 108.50 | 18.50 | 61.00 | 188.00 | 52.00 | 5 | 1 | 1 |
| 8 | Eric | 105.00 | 10.50 | 27.00 | 142.50 | 29.00 | 4 | 1 | 0 |

*League Champion

Recent Messages
59 "My team is the best..."- Superheros
58 "If I had made the playoffs, I would've won". Brooklyn Bonners
57 "Brock Lesnar is my hero". Boss Rutten Recent Trasactions
131 add Forrest Griffen drop Clay Guida- Superheros
130 add Miguel Torres drop Diego Sanchez- Junior Achievement
129 add Anthony Johnson drop Paulo Thiago - TMNT

FIG. 4

Logo | Dashboard | League | My Team | Fighters | Upcoming Events | Results | Draft | Join New League | Home | My Profile | Help | Logout 42  44  46  48  50  52

Invite Friends

Fighter Listing

Filter: [Select All ▼]  Search: [_____] [Search]   106

| Name | Rank | Category | Team | |
|---|---|---|---|---|
| Antonio Rodrigo | 3 | Heavyweight | 345 | Trade |
| Jeff Monson | 4 | Heavyweight | Free Agent | Add |
| Cain Velasquez | 12 | Heavyweight | Peter | Trade |
| Brett Rogers | 5 | Heavyweight | Free Agent | Add |
| Junior dos Santos | 23 | Heavyweight | Free Agent | Add |
| Alistair Overeem | 6 | Heavyweight | Free Agent | Add |
| Shane Carwin | 7 | Heavyweight | Free Agent | Add |
| Antonio Silva | 8 | Heavyweight | Free Agent | Add |
| Andrei Artovski | 8 | Heavyweight | Free Agent | Add |
| Frank Mir | 9 | Heavyweight | Free Agent | Add |
| Sammy Schilt | 3 | Heavyweight | Free Agent | Add |
| Chuck Liddell | 4 | Heavyweight | Free Agent | Add |
| Batten | 5 | Heavyweight | Sebastiaan | Trade |
| Ben Rothwell | 10 | Heavyweight | Free Agent | Add |
| Cheick Kongo | 11 | Heavyweight | Free Agent | Add |
| Fabricio Werdum | 12 | Heavyweight | Free Agent | Add |
| Tim Sylvia | 12 | Heavyweight | Free Agent | Add |
| Marcio Cruz | 13 | Heavyweight | Free Agent | Add |
| Yoshihiro Nakao | 14 | Heavyweight | Free Agent | Add |
| Roy Nelson | 15 | Heavyweight | Free Agent | Add |

1 [2][3][4][Last]

Tell Your Friends
Want to play MagWar with your buddies? Let them know about MagWar today!
(Tell Your Friends>>)

FIG. 6

| | | | | | | | | | Home My Profile Help Logout |
|---|---|---|---|---|---|---|---|---|---|
| Logo | 42 | 44 | 46 | 48 | 50 | 52 | | | |
| | Dashboard | League | My Team | Fighters | Upcoming Events | Results | Draft | | Join New League |
| | | | | | | | | | Invite Friends |

Georges 'Rush' St. Pierre — 112

| Primary Status: healthy and ready to go. | | |
|---|---|---|
| Overall Rank | Total Prizes | Owner |
| 1 | 82 | Team Cheddar |
| Next Fight: 03-29.2010 Vs Dan Hardy at UFC 111 — 114 | | |

Vital Statistics
| | |
|---|---|
| Name | Georges St. Pierre |
| Nick Name | Rush |
| Record | 19-2-0 (W-L-D) |
| Height | 5' 10" (175 cm) |
| Weight | 189 lbs (77 Kgs.) |
| Birth Date | 1981-05-19 |
| City | St. Isidore, Quebec |
| Country | Canada |

Fight History
| Result | Opponent | Event | Date | Method | Round | Time |
|---|---|---|---|---|---|---|
| Win | Thiago Alves | UFC 100 | 07-11-2009 | Decision (U) | 5 | 5:00 |
| Win | B.J. Penn | UFC 94 | 01-13-2009 | TKO | 4 | 5:00 |
| Win | John Fitch | UFC 87 | 08-09-2008 | Decision (U) | 5 | 5:00 |
| Win | Matt Serra | UFC 83 | 04-19-2008 | TKO | 2 | 4:45 |
| Win | Matt Hughes | UFC 79 | 12-29-2007 | Submission | 2 | 4:54 |
| Win | Josh Koscheck | UFC 74 | 08-25-2007 | Decision (U) | 3 | 5:00 |
| Loss | Matt Sera | UFC 69 | 04-07-2007 | TKO | 1 | 3:25 |

FIG. 7

| Logo | | | | | | | | | | | | | Home | My Profile | Help | Log out |
|---|---|---|---|---|---|---|---|---|---|---|---|---|---|---|---|---|
| Dashboard | League | My Team | Fighters | Upcoming Events | Results | Draft | | | | | | | | | | Join New League |

Event Results - UFC 117
8/7/2010
PPV Card

| Match | Winner | Team | Card Bonus | Win Points | Sub/KO Dec Bonus | Round Bonus | Grudge Bonus | Flex Adj | Tot Points | Method | Round |
|---|---|---|---|---|---|---|---|---|---|---|---|
| 1 | Dennis Hellman | | | | | | | | | Decision (Unanimous) | 3 |
| 2 | Stefan Struve | | 1 | | | | | | | KO (Punches) | 2 |
| 3 | Tim Boetsch | Sup | 2 | 10 | -2 | | | -50% | 5 | Decision (Unanimous) | 3 |
| 4 | Johny Hendricks | | 3 | | | | | | | TKO (Punches) | 2 |
| 5 | Phil Davis | Bos | 4 | 10 | -2 | | | | 12 | Decision (Unanimous) | 3 |
| 6 | Rick Story | | 5 | | | | | | | TKO (Punches) | 2 |
| 7 | Junior dos Santos | Bro | 6 | 10 | -2 | | | | 14 | Decision (Unanimous) | 3 |
| 8 | Matt Hughes | Sup | 7 | 10 | 4 | 3 | | | 24 | Submission (Anaconda Choke) | 1 |
| 9 | Clay Guida | Sup | 8 | 10 | 4 | 1 | | | 23 | Submission (Jaw Injury) | 3 |
| 10 | Jon Fitch | Cha | 9 | 10 | -2 | | 3 | | 20 | Decision (Unanimous) | 3 |
| 11 | Anderson Silva | TMN | 10 | 20 | 4 | 1 | | 5 | 40 | Submission (Triangle Armbar) | 5 |

| Match | Loser | Team | Card Bonus | Decision Bonus | Round Bonus | Grudge Penalty | Flex Adj | Tot Points | Method | Round |
|---|---|---|---|---|---|---|---|---|---|---|
| 1 | Ben Saunders | Bro | | 2 | | | | 2 | Decision (Unanimous) | 3 |
| 2 | Christian Morecraft | | 1 | | | | | | KO (Punches) | 2 |
| 3 | Todd Brown | | 2 | | | | | | Decision (Unanimous) | 3 |
| 4 | Charlie Brenneman | | 3 | | | | | | TKO (Punches) | 2 |
| 5 | Rodney Wallace | | 4 | | | | | | Decision (Unanimous) | 3 |
| 6 | Dustin Hazelett | | 5 | | | | | | TKO (Punches) | 2 |
| 7 | Roy Nelson | TMN | 6 | 2 | | | -50% | 4 | Decision (Unanimous) | 3 |
| 8 | Ricardo Almeida | Bro | 7 | 0 | | | -50% | 3.5 | Submission (Anaconda Choke) | 1 |
| 9 | Rafael dos Anjos | Jun | 8 | 0 | 2 | | -50% | 5 | Submission (Jaw Injury) | 3 |
| 10 | Thiago Alves | Sup | 9 | 2 | | -3 | | 8 | Decision (Unanimous) | 3 |
| 11 | Chael Sonnen | Bro | 10 | 0 | | 4 | -5 | 9 | Submission (Triangle Armbar) | 5 |

FIG. 9

SYSTEM AND METHOD FOR FANTASY MIXED MARTIAL ARTS GAME

A portion of the disclosure of this patent document contains material which is subject to copyright protection. The copyright owner has no objection to facsimile reproduction by anyone of the patent document or the patent disclosure, as it appears in the Patent and Trademark Office patent file or records, but otherwise reserves all copyright protections whatsoever.

This application claims priority from U.S. Provisional Application No. 61/293,644, filed on Jan. 9, 2010 and U.S. Provisional Application No. 61/260,178, filed on Nov. 11, 2009, both of which are incorporated by reference in their entirety.

BACKGROUND

Mixed Martial Arts (herein referred to as "MMA") fantasy sports games are derivative games in which scoring and outcomes are determined by the statistical results of real world MMA events (herein referred to as "events," "fight cards," or "cards"). MMA is a real world combat sport organized by various promotional organizations including UFC®, WEC®, Strikeforce™, Dream, Bellator, and others. MMA involves two combatants (herein referred to as "fighters") who compete in three or five round matches (herein referred to as "fights" or "matches"), according to standardized rules dictated by the athletic commission of the state or country in which the fight is being held.

Fantasy MMA comprises unique derivative games in which the scoring elements are based on the statistical results of real-world MMA events. In MMA fantasy games currently available in the marketplace, game users (herein referred to as "users," "managers," or "participants") predict the outcomes of all fights during applicable fight cards. Rather than selecting fighters to form fantasy teams (herein referred to as "teams" or "rosters") to compete within a league, existing formats require users to predict outcomes for all the fights on applicable cards. Thus more than one user can select the same fighter(s) from a fight card, since every user makes a pick for every fight on the card. New selections are made with every card and users do not hold fighters over time on teams. Existing fantasy MMA game formats are essentially card-picking games, without fighter selection exclusivity. This makes existing fantasy MMA games fundamentally different from other fantasy sports such as football, baseball, basketball, etc. Please see the following web pages for examples of existing fantasy MMA games:

http://fantasy.ufc.com/index.cfm?fa=fantasy.rules
http://www.mmaplayground.com/rules.aspx
http://mmajunkie.com/Fantasy/Rules.aspx There is a fight frequency problem inherent to MMA which has until now prevented fantasy MMA from evolving from card-picking games (such as the three noted above) into games involving drafting fighter teams with fighter exclusivity within each league. This fight frequency problem creates a significant devaluation of all fighters immediately after they conclude a fight and thus is a major disincentive to hold fighters over the course of a season.

Elite MMA fighters typically fight between two to four times annually. As such, there exists a major imbalance between the frequency that an individual fighter fights and the frequency of MMA fight cards, which occur much more often—typically two to four per month.

Many fight cards will take place in between an elite fighter's fights. Thus, dropping elite fighters after they fight for less elite fighters who are fighting on upcoming fight cards would allow for the accumulation of more fight and scoring opportunities over the course of a game. Additionally, some fighters generally fight more often than others, creating a further imbalance of fight opportunities.

This is not an issue in other fantasy sports such as football or baseball since they have defined seasons and significantly higher game (corollary to fight) opportunities for their players over the course of each season. Due to the lack of existing solutions to the fight frequency problem, team rostering and fighter selection exclusivity within leagues have been missing from prior-art fantasy MMA games. Without targeted rules designed to counter the MMA fight frequency problem, elite fighters have little additional value over other less elite fighters, making fighter drafting, rostering and exclusivity pointless, as there is there is too much natural disincentive to hold fighters over time due to limited fight frequency. The embodiments described herein include rules designed to offset the MMA fight frequency problem.

SUMMARY OF THE INVENTION

Generally speaking, and referring in a non-limiting way to specific embodiments of the invention, a system and method is presented for establishing a plurality of leagues for a plurality of participants to play an MMA fantasy fighter game based on, and including incentives for, team rostering and fighter exclusivity. In one embodiment, the system comprises an automated web-based platform providing the MMA fantasy fighter game, using a PHP-based server.

In one embodiment, the participants may be compiled into separate leagues via automated processes provided by the web-based platform. Each league selects MMA fighters utilizing a draft or auction feature to form respective fantasy teams. Fantasy teams compete with the other teams within each league, scoring points based on the statistical results of MMA fight events in accordance with game rules, including a predefined course of time.

The automated web-based platform may be configured to facilitate the plurality of participants to access a graphical user interface (GUI) area defined in the form of a main webpage. The web-based platform renders an automated processing of MMA fantasy game functionalities such as scoring tabulation and presentation, drops and adds, trades, grudge matches, vetos, fighter contracts and holding period restrictions. The automated web-based platform provides the tools necessary for the plurality of participants to manage their respective fantasy teams and play the MMA fantasy fighter game.

The scoring elements may be based on any of a number of statistical categories: win/loss, submission, knock-out (KO), technical knock-out (TKO), decision type, round of victory, and fight card position. Scoring elements may also be differentiated by television broadcast type, championship, fight promotion, and weight class.

Winning the MMA fantasy fighter game can occur in a variety of ways. Common methodologies would include total points scored by the fantasy team, total wins by the fantasy team or highest fantasy team winning percentage over the season. Alternatively, a playoff format can be established with only the highest scoring fantasy teams advancing to a final sub-period of the MMA fantasy fighter game season. The winner of the game would then be determined by points scored during this final playoff period.

Other features and advantages of the present invention will become apparent from the following detailed description, taking in conjunction with the accompanying drawings, which illustrate, by way of example, the principals of the present invention.

BRIEF DESCRIPTION OF THE DRAWINGS

FIG. 2 is an exemplary webpage of the present embodiment, illustrating a leagues page, which allows users to create a private fantasy league or to join any of several types of public fantasy leagues.

FIG. 4 is an exemplary webpage of the "playoff format" embodiment, illustrating a league homepage, which includes scoring results, team standings, messages, and transactions.

FIG. 6 is an exemplary webpage of the present embodiment, illustrating a fighters page showing a list of real world MMA fighters applicable to the game, and including functionality for adding or trading fighters.

FIG. 7 is an exemplary webpage of the present embodiment, illustrating an individual fighter page showing the fight history, vital statistics and the scheduled MMA event(s) of that fighter.

FIG. 9 is an exemplary webpage of the present embodiment, illustrating results from a particular MMA event and the corresponding scoring of the fantasy teams with fighters involved in the event.

DETAILED DESCRIPTION OF THE PREFERRED EMBODIMENTS

The embodiment detailed here, which presently I believe operates most efficiently, is a system and method for establishing a plurality of MMA fantasy leagues for a plurality of participants, each drafting fighters utilizing an on- or off-line draft feature to form respective fantasy teams composed of real world MMA fighters. The system comprises an automated web-based platform providing the MMA fantasy fighter game using a PHP based server.

The fantasy teams within each league compete with one another based on the results of real-world MMA fight events in accordance with game rules, including contracts, scoring metrics, and a defined period of time fantasy "season." A twelve-month season may be used and broken into quarters for awards purposes or to create a playoff format. In the presented embodiment, each league begins its season on the first day of any month of the Gregorian calendar.

Figure 1:
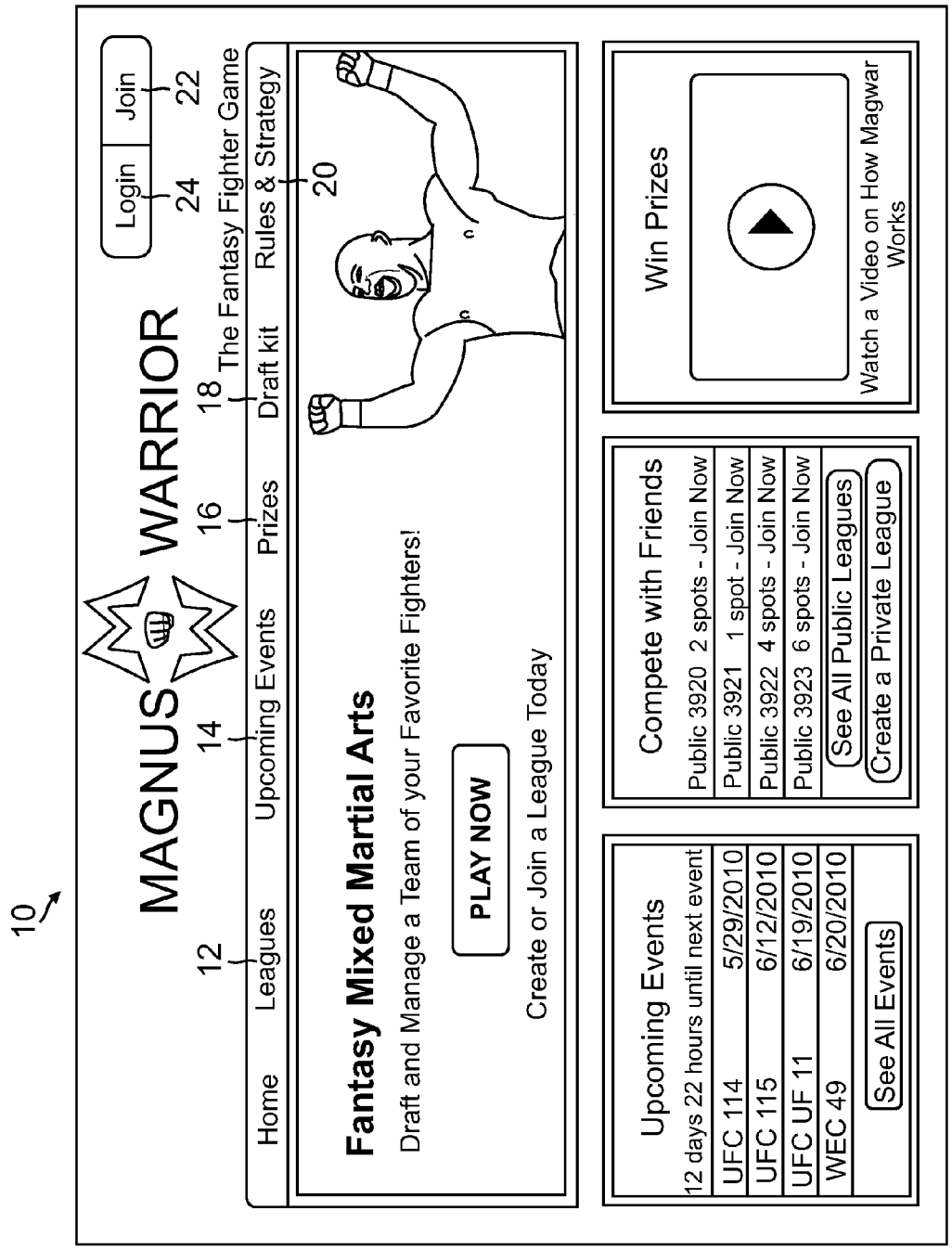
FIG. 1 is an exemplary main webpage of the present embodiment, illustrating a main marketing page with a plurality of links illustrating mixed martial arts (MMA) fantasy fighter game features, rules and methods for joining or creating leagues.

FIG. 1 is an exemplary main webpage of the embodiment. The automated web-based platform is operable to facilitate the plurality of participants to access a graphical user interface (GUI) area defined in the form of the main webpage 10. A game interfacing area included in the main webpage allows the plurality of participants to access links to a leagues page 12, an upcoming events page 14, a prizes page 16, a draft kit page 18, and rules & strategy page 20.

The main webpage 10 includes a participant registration area 22, that allows each participant to access a registration page for registering into the automated web-based platform by entering requested information and creating a participant account. The main webpage 10 also includes a log-in module 24 that allows a registered participant access to a user homepage 40 (herein referred to as "dashboard") corresponding to the registered participant.

FIG. 2 is an exemplary leagues webpage 30 of the embodiment. This page may be accessed via a link to leagues 12 on the main webpage 10. The plurality of participants is provided links with the option to create a fantasy private league 32 with personal friends or to enroll in fantasy public leagues 34 as individuals. Each of these various types of leagues is available and administered via the web-based platform.

Private league commissioners will have the ability to create a new fantasy private league by inviting friends via email, utilizing the create private league area 32 on the leagues page 30. For private leagues, the automated web-based platform allows a league creator (herein referred to as "commissioner") to enter the draft results if her fantasy private league chooses to have an off-line draft for initial fighter allocation purposes at league inception.

The MMA fantasy fighter game will also be offered in a public league format 34 for participants who want to join leagues without having to invite others. Public leagues will not have a commissioner; the web-based platform will automatically organize individual users to form public leagues as they sign up and all drafts will be held online.

Figure 3:
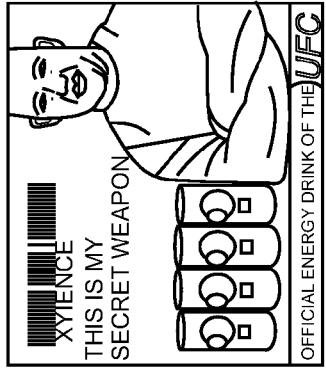
FIG. 3 is an exemplary webpage of the present embodiment, illustrating a user homepage and a plurality of links, which allow a user to manage and navigate teams and leagues.

FIG. 3 is an exemplary dashboard page 40 of the embodiment, illustrating a plurality of links showing a plurality of MMA fantasy fighter game functionalities. The dashboard page 40 includes details of currently enrolled fantasy leagues and fantasy teams and access to a league homepage 42.

FIG. 4 is an exemplary webpage of one embodiment, illustrating a league homepage 60 that provides specific league information, including team scoring and standings 62, messages 64 and transactions 66. The league homepage also illustrates grudge matches 68 and contract exemptions 70. Both the dashboard page 40 and the league homepage 60 include a link to my team 44, a link to fighters 46, a link to upcoming events 48, a link to results 50, and a link to draft 52.

Figure 5:
FIG. 5 is an exemplary webpage of the present embodiment, illustrating a my team page showing the current MMA fighters rostered on the user's fantasy team, along with fighter contract information and scoring from the inception of the league.

FIG. 5 is an exemplary webpage of the present embodiment, illustrating a my team page 80 showing a participant's rostered team of MMA fighters 82 along with their scoring 84 since the inception of that particular fantasy league. The plurality of participants can access the my team page 80 by clicking the link to my team 44 in the dashboard page 40 or the league homepage 60. The my team page also provides a show dropped player history link 86 to expand the list of rostered fighters to show all fighters dropped from the team since league inception, along with their scoring. The my team page 80 also includes an edit team settings link 88 to a page that allows each manager to alter his team name, picture logo/avatar, login/password and contact information. The my team page 80 also includes a trade link 90 to trade fighters to other teams within that particular fantasy league. The my team page 80 also includes a drop link 92 to drop fighters and add free agent fighters from a free agent fighter pool for that league. The my team page 80 also includes fighter contract information 94.

FIG. 6 is an exemplary fighters webpage 100 of the embodiment. The link to fighters 46 in the dashboard page 40 and league homepage 60 allows the plurality of participants to access a fighters page 100 that contains details of all real-world MMA fighters that are rostered or available for pickup within a particular league. The plurality of participants can click on a fighter's name 102 to access and view the fighter specific information, including statistics, upcoming fight events, and scoring history. The fighters page 100 also allows the plurality of participants to select real world MMA fighters to add 104 fighters that are not already rostered to their respective fantasy teams and to trade 106 fighters with other teams within each respective fantasy league.

FIG. 7 is an exemplary individual fighter webpage 110 of the embodiment. The plurality of participants can click on a fighter's name 102 on any of the aforementioned webpages to navigate to an individual fighter page 110 devoted to that respective fighter, which includes proprietary analysis, recent news about fantasy status 112, scheduled MMA event(s) of the fighter 114, vital statistics 116 and fight results history 118 as shown in FIG. 3. These data can be inputted and edited by the web-based platform administrators to be then distributed automatically across all MMA fantasy fighter game leagues.

Figure 8:
FIG. 8 is an exemplary webpage of the present embodiment, illustrating upcoming MMA events applicable to the game, and including functionality for adding, dropping and trading fighters, along with the ability to challenge other managers to grudge matches.

FIG. 8 is an exemplary upcoming events webpage 120 of the embodiment. A link to upcoming events 48 in the league homepage 60 allows the plurality of participants to access an upcoming events page 120, which provides access to the details of upcoming MMA events and the fighters involved 122. The upcoming events page 120 also provides an option for the plurality of participants to select MMA fighters who are not yet rostered within a particular league to add 124 to their respective fantasy teams. Additionally, the upcoming events page 120 allows participants to trade 126 fighters with other teams within a particular league and to challenge other participants to a grudge match 128 when they have fighters matched up against one another on an upcoming fight card.

FIG. 9 is an exemplary results webpage 130 of the embodiment. A link to results 50 in the league homepage 60 allows the plurality of participants to access the results webpage 130, which provides access to the details of the relevant statistical outcomes 132 of each applicable MMA event that has occurred since league inception, along with a detailed breakdown of corresponding fighter scoring for each event 134. The results page 130 outlines each of the scoring metrics applicable to the game, including cascading card bonus 136; win points 138; submission, knock-out and decision bonuses 140; round bonus 142; grudge match bonus/penalty 144; and flex fighter scoring adjustment 146.

The link to draft 52 in the league homepage 60 provides an online draft feature that allows the plurality of participants to accomplish the process of drafting real world MMA fighters to create their respective fantasy teams at the beginning of each league season. This is accomplished via an automated process provided to users via the web-based platform. For fantasy private leagues that select an offline draft, this link provides a means for the commissioner to enter draft results to fill the team rosters and create the league. The automated web-based platform renders an automated processing of MMA fantasy game functionality such as trades, drops and adds, vetoes, grudge matches, fight contract exemptions and flex fighter position's scoring and substitution privileges. The automated web-based platform provides the plurality of participants with the tools needed to manage their respective fantasy teams from the on-line draft feature to tracking fighter contracts to the ongoing dropping and adding of the fighters over the fantasy season.

Figure 10:
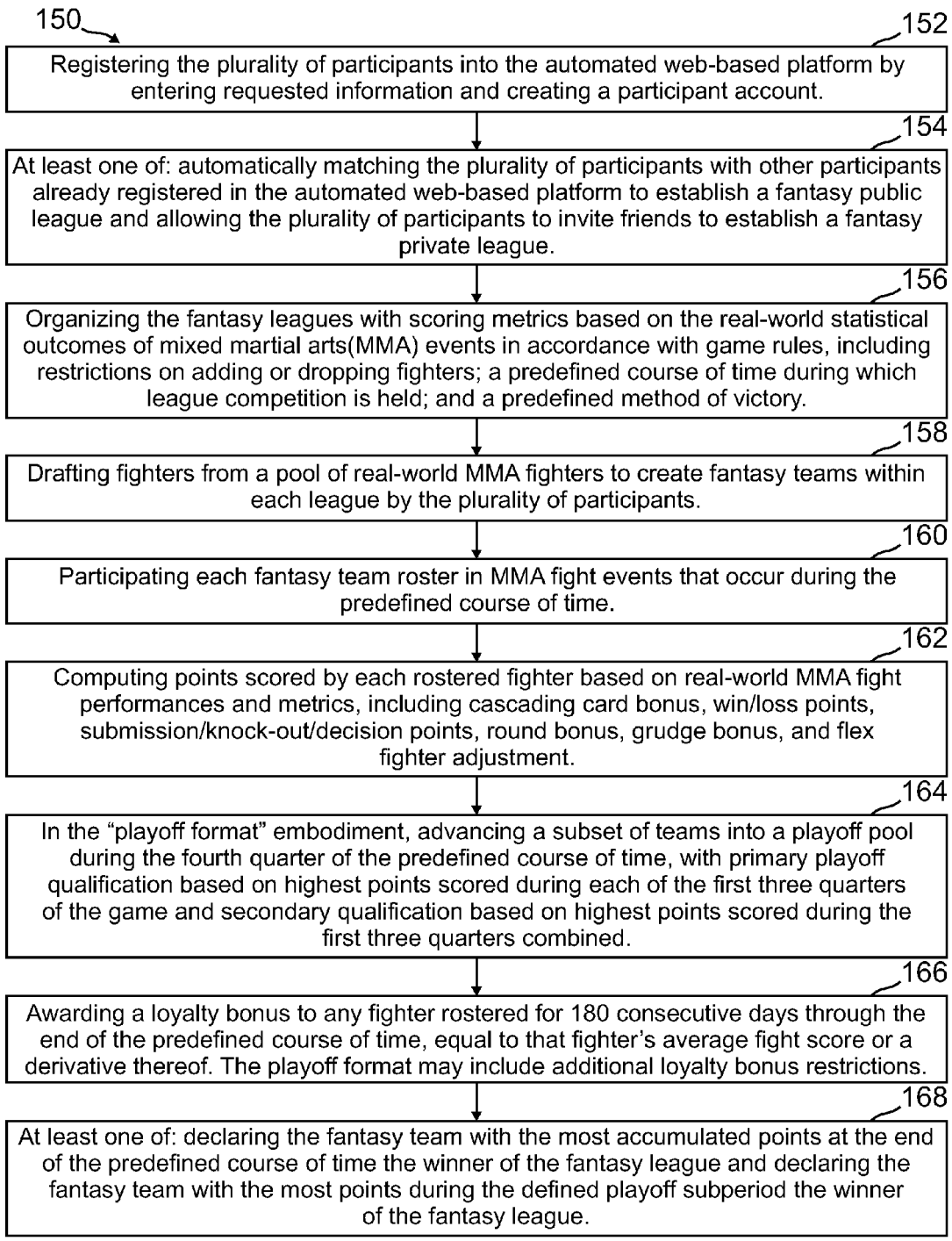
FIG. 10 is a flowchart of the preferred embodiments, illustrating a method for establishing an MMA fantasy league to a plurality of participants utilizing an automated web-based platform and the steps involved in the game from the beginning to the end of the predefined course of time.

FIG. 10 is a flowchart of the present invention, illustrating a method for establishing an MMA fantasy fighter game league for a plurality of participants 150 utilizing an automated web-based platform.

Initially, each participant is registered into the automated web-based platform by entering requested information in the participant registration area 24 and creating a participant account as indicated at block 152.

At block 154, the plurality of participants is automatically matched with participants already registered in the automated web-based platform to establish a fantasy public league 34 with scoring based on MMA fight events. Or alternatively a fantasy private league 32 is created by a commissioner who is provided the ability to invite her friends via email.

The fantasy league is organized in accordance with MMA fantasy fighter game rules including scoring based on the outcomes of real-world MMA events, restrictions on adding and dropping fighters 94, a predefined course of time during which league competition is held, and a predefined method of victory, as indicated at block 156.

At block 158, each participant can draft real world MMA fighters to create a fantasy team. Fighters participate in MMA fight events as indicated at block 160.

At block 162, each fighter on a fantasy team scores points based on their real world statistical performances during these fight events. Points are scored based on cascading card bonus 136, win/loss 138, submission/knock-out (KO)/decision 140, the round in which the fight ends 142, grudge match 144, and flex fighter adjustment 146.

The web-based platform automatically tabulates the total points of each fantasy team and presents them to managers after each event and at the end of the fantasy league season or sub-periods as indicated at block 162.

In the "playoff format" embodiment, a subset of teams advances to a sub period of the predefined course of time, known as the playoff. Teams qualify by scoring the most points during each of the first three quarters of the predefined course of time. Additional qualifications occur based on the highest points scored during the first three quarters combined, as indicated at block 164.

At block 166, a loyalty bonus is awarded to fighters rosters held for 180 consecutive days through the end of the predefined course of time, equal to the fighter's average fight score or a derivative of the average.

At block 168, the team scoring the most points over the entire predefined course of time or during the playoff sub period is declared the winner of the fantasy league.

Figure 11:
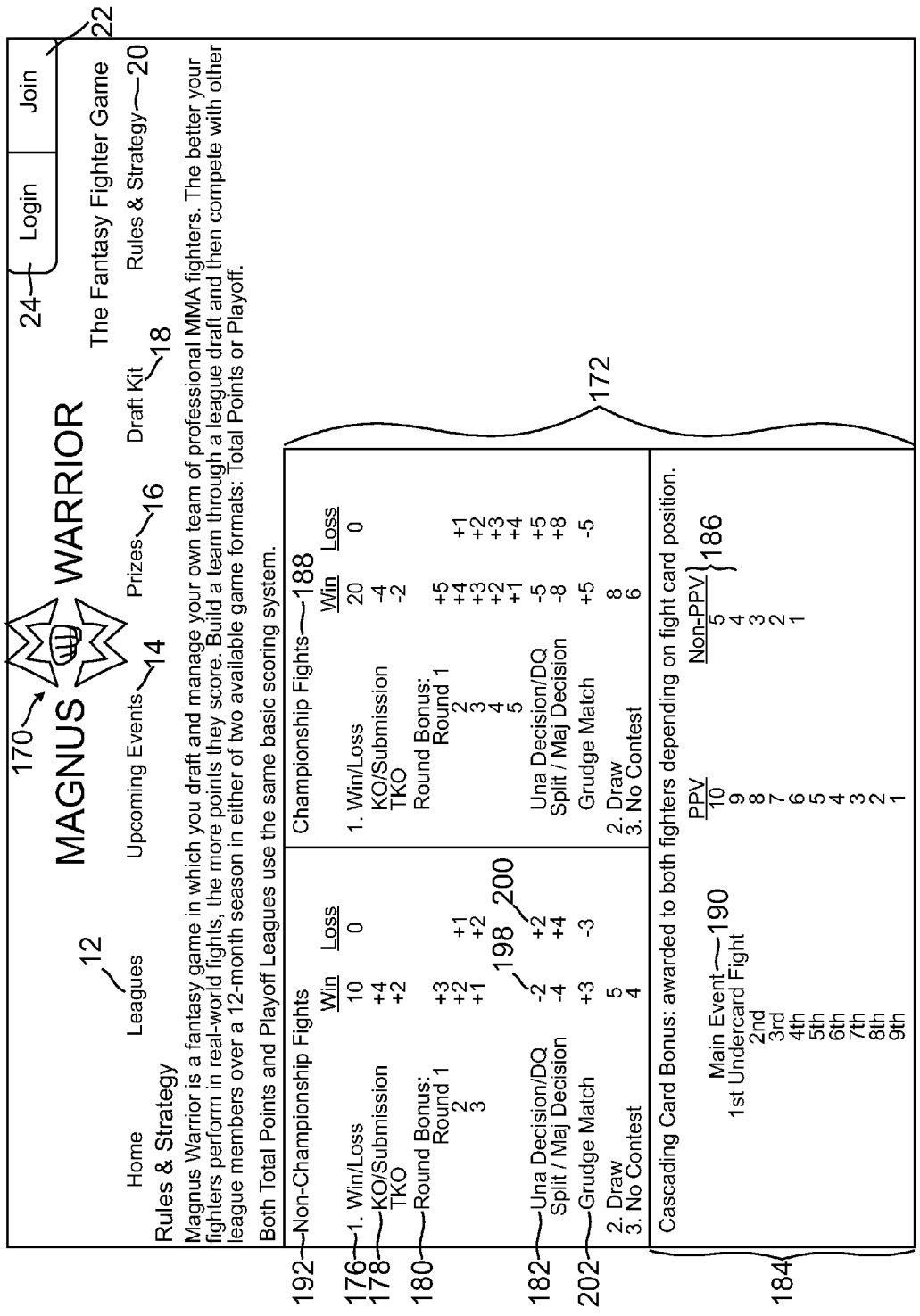
FIG. 11 is an exemplary webpage of the present embodiment, illustrating the rules and strategy, including a table with standardized scoring elements describing how rostered fighters score points for their fantasy teams based on real-world MMA events.
Figure 12:
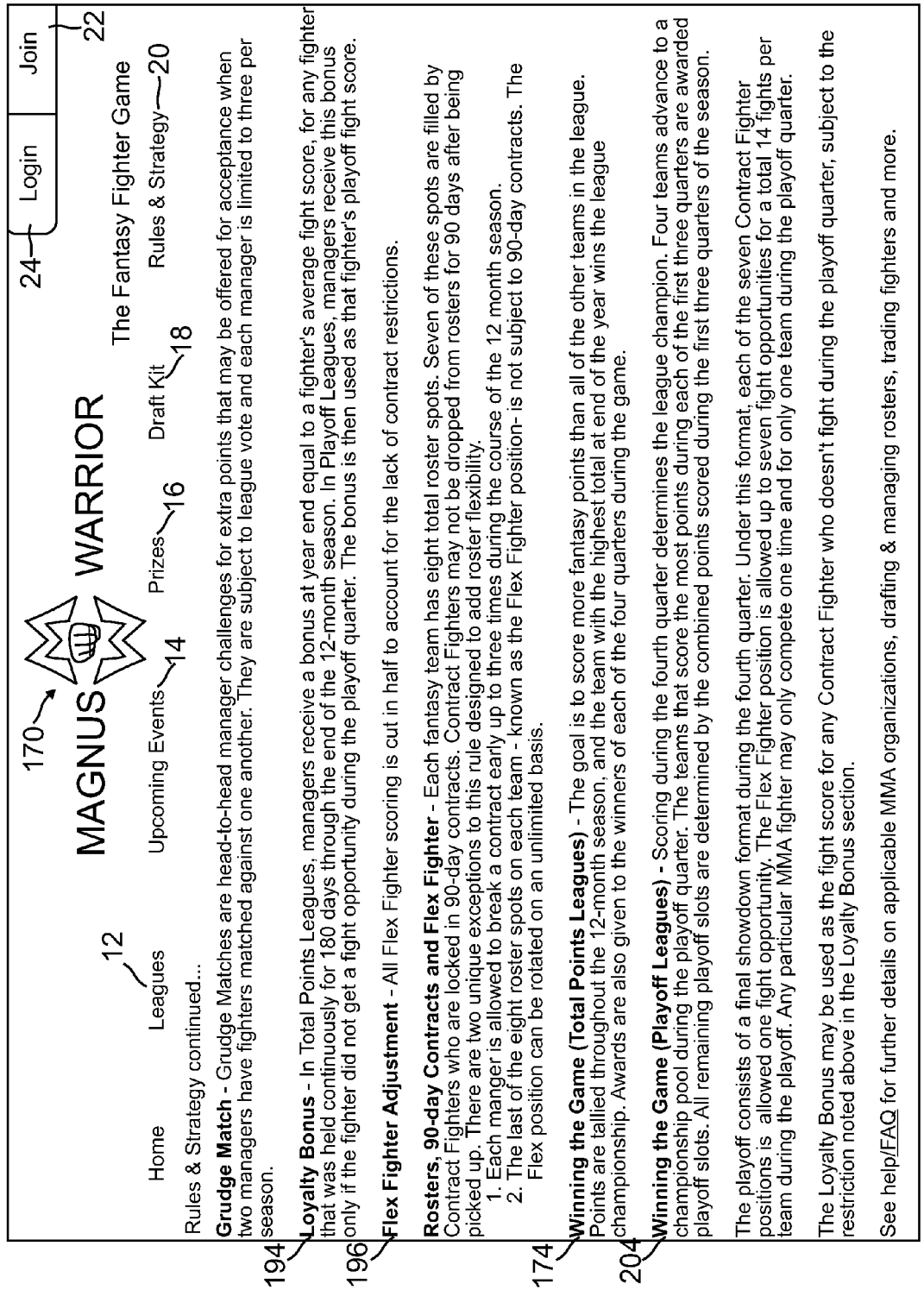
FIG. 12 is a continuation of FIG. 11, an exemplary webpage of the present embodiment, illustrating rules and strategy, including descriptions of grudge match; loyalty bonus; flex fighter adjustment; roster and contract restrictions; and winning methodologies for both "total points" and "playoff" formats.

FIG. 11 and FIG. 12 show an exemplary rules & strategy webpage 170 of the embodiment. A link to rules & strategy 20 in the main webpage 10 of the embodiment provides access to game scoring elements and rules.

Game Rules Designed to Mitigate the MMA Fight Frequency Problem and Provide Incentives to Roster Fighters—

Leagues can have any number of teams depending on user or platform administrator specifications. Each manager can create a respective fantasy team roster consisting of a plurality of contract fighter spots 82 and at least one contract-exempted roster spot (herein referred to as "flex fighter" 83). In the presented embodiment, leagues comprise eight teams, with a total of eight fighters comprising each team.

Each contract fighter is locked onto the fantasy team roster through a 90-day contract 94 upon being picked up. The 90-day contract rule forces the holding of fighters to mitigate the previously discussed drop incentive that is otherwise present as a result of the MMA fight frequency problem. The fantasy game rules may include a limited number of 90-day contract exemptions 70 for the contract fighters, which allow managers some flexibility to cancel contracts. Further manager flexibility is created via the flex fighter 83, which is free from the 90-day contract rule. With no contract restrictions, the flex fighter 83 enables each manager to have at least one fighter involved in every applicable MMA fight event since the roster position can be turned over repeatedly. This promotes some interest in every such MMA event and provides continuity to the game.

Each user has the option of dropping fighters 92 from his fantasy team and adding free agent fighters from a free agent fighter pool 104 per the guidelines and restrictions of the 90-day contracts, which directly offset the incentive to drop a fighter right after he fights.

An exemplary standardized scoring schedule 172 of the embodiment is presented in the rules & strategy page 170, which comprises a system and method for providing MMA fantasy fighter games to a plurality of leagues. In the "total points" format 174, the manager within each league that scores the most points over the entire fantasy season is declared the winner.

The scoring elements 172 may be based on any of the following statistical categories: win/loss 176, submission 178, knock-out (KO) 178, technical knock-out (TKO) 178, decision type 182, round of victory 180, and fight card position 184. Scoring elements 172 may also be differentiated by television broadcast type 186, championship 188, fight promotion, and weight class.

Cascading card appearance bonus 184 is added to the fighters' scores based on how high (or late) a fight is positioned on a particular MMA fight card, regardless of win or loss. Pay-per-view (PPV) differentiation is an alteration to the cascading card appearance bonus based on whether or not the MMA fight event is on PPV television 186. This allows PPV MMA fight events to be worth more since they typically feature better fighters. In this embodiment, the cascading card appearance bonus 186 is awarded with a sliding scale from 10 to 1 for PPV cards and from 5 to 1 for non-PPV cards starting with the top-of-the-card fight (herein referred to as "main event" 190) and then moving down. In other embodiments, the main event award may start at any other number and then cascade down according to fight position based on some standardized methodology such as an equal number of points or percentage. Typically, elite fighters fight at the higher levels of each fight card, so this bonus adds value to those fighters, providing a further offset to the fight frequency problem as managers are incented to hold on to elite fighters since they have higher scoring potential.

Championship fights 188 are scored differently than non-championship fights 192 in order to add value to championship fighters. Extra points are awarded for a variety of scoring metrics. This adds value to fighters that fight for real-world championships, further enhancing the value of elite fighters.

A game-end bonus (herein referred to as "loyalty bonus" 194) is added to each roster position's scoring total at the end of the MMA fantasy fighter game. The loyalty bonus 194 is equal to or a derivative of an individual fighter's average fight score. In the presented embodiment it is awarded as the average of all fight scores that occurred during a fighter's continuous time on the team and is awarded only to an end-of-game fighter who has been rostered continuously for at least 180 days through the end of the season. Other embodiments might vary the length of time required to qualify for the loyalty bonus.

The loyalty bonus is implemented as an additional solution to the fight frequency problem to eliminate the incentive to drop and replace elite fighters with expired contracts just before season end in order to generate additional fight and scoring opportunities. This also helps to mitigate the fight frequency issue of elite fighters typically not fighting more than two to four times per year, as it effectively creates the equivalent of an extra fight and scoring opportunity during the game for such elite fighters.

Scoring for the flex fighter position(s) is automatically reduced 196 relative to the 90-day contract fighters to lessen the overall scoring contribution of the flex fighter position in order to balance game scoring. This is because with no contract restrictions, the flex fighter has potential to be turned over with every applicable MMA event, creating significantly more scoring opportunities for this position. In the presented embodiment, flex fighter scoring is cut in half relative to contract fighters by the automated web-based platform, but other embodiments might vary the amount or methodology of this scoring adjustment.

A submission bonus 178 may be awarded for submissions. In this embodiment, submission scoring is generalized 178, but in other embodiments, this bonus may be differentiated further by the type of submission. These include but are not limited to rear-naked choke, triangle choke, guillotine choke, gogoplata, arm triangle, arm bar, kimura, americana, omoplata, knee bar, ankle lock, heel hook, leg lock and more.

Whenever two managers have fighters on their rosters matched against one another, each manager has the opportunity to challenge the other manager to a grudge match 128 for that particular fight. If accepted by the second manager and approved by the league, the winning fighter scores additional points for the fantasy team on which he is rostered, and the losing fighter loses additional points for the fantasy team on which he is rostered. In the presented embodiment, the manager of each fantasy team is limited to three grudge matches per season and grudge matches are not allowed during the last quarter of the league season.

Win and loss points 176 are awarded to the MMA fight winner and loser. Round bonus 180 is awarded to either fighter depending on the round in which the MMA fight ends. KO/TKO/Submission bonus 178 is awarded to the winner according on how he wins the fight. A decision bonus/penalty 182 is applied to MMA fights that end in a judges' decision. The winner gets a decision penalty 198 (decision win considered less valuable than KO/TKO/submission win), the loser a decision bonus 200 (decision loss considered more valuable than KO/TKO/submission loss), both of which are in addition to the win and loss points 176.

Here are two specific examples of how the points 172 can be calculated per the scoring rules outlined in FIG. 11:

a. For a 90-day contract fighter, championship 2nd Rd TKO PPV card main event with an accepted grudge match challenge, =10 (win 176)+2 (TKO 178)+4 (Rd 2 180)+10
(champ 188)+10 (appearance card 184)+5
(grudge 202)=41 total points.

b. For a flex fighter, non-championship 3rd Rd submission in 1$^{st}$ undercard position on a non-PPV card with no grudge match challenge =[10 (win 176)+4 (submission 178)+1 (Rd 3 180)+4
(appearance card 184)]÷2 (flex 196)=9.5 total
points.

In the total-points embodiment, the fantasy team having the most accumulated points within its league at the end of the fantasy season is declared the fantasy league winner. An award may be granted to this fantasy league winner depending on the league-specific settings. Additional awards are also given for points scored within specific periods such as quarters. These point calculations will be tabulated and dispersed automatically across all leagues via the automated web-based platform.

Considering now an alternative embodiment, the web-based platform may provide users the option of joining or creating leagues with a "playoff" format 204. All regular scoring metrics apply. The main difference lies with the method of victory. This format comprises a predefined period season with a predefined final sub-period known as a playoff. A limited subset of teams within each league qualifies to enter the playoff pool and scoring during the playoff alone determines the league champion.

In this additional embodiment, outlined in FIG. 10, FIG. 11 and FIG. 12, the same flow chart presented before shows the variation at block 164. In this embodiment, the season is defined as a 12-month period, further subdivided into quarters, with the fourth quarter designated as the playoff. To qualify for the playoff, a team must score the most fantasy points within its league during any of the first three quarters of the league season. This will determine between one and three qualifiers in each league. The remaining playoff qualifier(s) will be determined by fantasy team scoring totals during the first three quarters of the league season combined.

During the playoff round, each team gets only a single fight opportunity per contract fighter roster position; this limit is created to achieve the first of two steps comprised by this alternative embodiment, which combined with rule methodologies specified earlier, virtually eliminate the MMA fight frequency problem entirely.

The second of these steps is the application of the previously mentioned loyalty bonus as the single fight score for any fighter that doesn't fight during the playoff period, but meets the other loyalty bonus criteria. These two steps eliminate any advantage to fighters fighting more frequently and other issues related to the MMA fight frequency problem. Elite fighters are more likely to be held through the course of the season in order to benefit from their higher scoring ability during the playoff, even if they don't actually fight during the final quarter.

The flex fighter position may be excluded from this restriction during the playoff to some degree. In this embodiment, the flex fighter is allowed fight opportunities equal in number to the total number of contract positions on each roster—in this case seven—during the playoff.

An alternative embodiment may include fight promotion differentiation based on which fight promotional organization (UFC®, WEC®, Strikeforce™, DREAM, etc) is holding the MMA fight event. This allows for higher valuations for specific promotional organizations depending on user preferences. This type of scoring differentiation may be an alteration to the cascading card appearance bonus, win/loss points, bonuses or other scoring methodologies that favor fighters who fight in certain promotional organizations. This may be used to add value to fighters who fight in elite organizations against higher level competition.

Another alternative embodiment comprises weight class differentiation. This may come in different forms, with two examples presented:

a. roster position designations which make it mandatory to fill the position with a fighter from a particular weight class or classes;

b. or additional points scored for fight wins, appearances or other scoring metrics based on weight class.

This can be used to add value to certain weight classes over others as a solution to weight-based fight frequency discrepancies. For example, some leagues may choose to create extra scoring for heavier fighters based on the premise that heavier fighters fight less frequently on average than lighter fighters.

Other embodiments may include limitations on the total quantity of fights during the season or a sub period thereof for each team as a supplemental or alternative mitigation of the fight frequency problem. Restrictions on transactions such as adding or dropping fighters, rather than or in addition to holding period time frames may also be used in other embodiments to mitigate the fight frequency problem.

Additional embodiments may include a reserve roster 85 where fighters may be placed in between fights as an alternative to dropping them from a team. Scoring for fighters who participate in real-world MMA events while on reserve may be discounted or invalidated entirely depending on league and embodiment. This additional roster space may be subjected to restrictions such as a minimum holding period for fighters before they may be placed on reserve or only a limited number of reserve roster spots 85 comprising the reserve portion of the roster.

The scoring elements 172 may be optional and customizable with private fantasy leagues. The fighters can score points 134 based on fight outcomes according to the league-specific scoring settings. The table shown in FIG. 11 is an example of a scoring format. It is clearly understood that the scoring elements 172 and the points scored 134 by the fighters are according to the scoring settings specific to embodiment and league.

From the description above, a number of advantages of the presented embodiments of my automated web-based platform MMA fantasy fighter game become evident, and one or more of these advantages may appear in particular embodiments:

(a) Users may draft and manage a team of their favorite fighters, rather than just picking the results of fight cards.

(b) MMA fight frequency problem is mitigated.

(c) Users may play a defined MMA fantasy season, even though there isn't one in real-world MMA.

(d) Users may play in a playoff format, which often generates more finality and excitement, along with a boost in value of elite fighters.

(e) Fighters who usually finish fights in a decisive manner (KO/submission/TKO), rather than by judge's decision are worth more, again adding value to elite fighters.

(f) Fighters who fight higher on cards, closer to the main event against generally tougher opponents, are worth more.

(g) Fighters who fight for and hold real-world championships are worth more.

(h) Fighters who fight for stronger organizations are worth more.

(i) Fighters who fight on PPV cards are worth more.

(j) Fighters who fight bigger, heavier opponents are worth more.

Accordingly, it is understood that an automated web-based platform as described by the various embodiments presented will provide participants with the ability and incentives to draft and manage a team of MMA fighters within a competitive league over the course of a fantasy season. Without such incentives, fantasy MMA will continue to be mired in generic card-picking games, rather than the dynamic MMA team management games that comprise the various embodiments presented here.

Once established, this feature would be instrumental in creating an extremely fun and interactive MMA fantasy gaming experience for fantasy players on a commercial scale via a website tied to the automated web-based platform and a centralized server. The invention would play a crucial role in the creation of fundamentally sound and dynamic MMA fantasy fighter games with incentives and structure for team rostering and fighter exclusivity with leagues.

While particular embodiments of my invention have been illustrated and described, it will be apparent that various modifications can be made without departing from the spirit and scope of the invention. For example, the web-based platform may include additional functionality such as differentiated scoring variables and metrics. Accordingly, it is not intended that the invention be limited, except as by the appended claims.

What is claimed is:

1. A non-transitory computer readable storage medium encoded with computer program instructions which when accessed by a computer cause the computer to load the program instructions to a memory therein creating a special purpose data structure causing the computer to operate as a specially programmed computer, executing a method for establishing a mixed martial arts (MMA) fantasy league to a plurality of participants each drafting fighters utilizing an on-line draft feature to form respective fantasy teams composed of real world MMA fighters, the method comprising:

creating in the specially programmed computer a database of participants and at least one unique MMA team selected by and associated with each participant;

providing an MMA fantasy fighter game, in which a plurality of fantasy teams compete within at least one league in accordance with game rules;

providing each of the plurality of participants access to a standard graphical user interface (GUI), the GUI having a participant sign-in capability, a unique webpage corresponding to each registered participant and a league-specific area allowing the participant access to a league homepage that provides league information and a plurality of links to league and game functionality;

wherein the game rules include:

scoring metrics based on real-world MMA fight events, selected from among past, present and future MMA fight events;

at least one of: holding period restrictions, add restrictions, drop restrictions, and fight quantity restrictions;

a predefined course of time during which league competition is held; and a predefined method of victory.

2. The non-transitory computer readable storage medium as defined in claim 1 wherein the predefined course of time for the MMA fantasy team rosters to compete with each other is limited to a finite time-period fantasy season.

3. The non-transitory computer readable storage medium of claim 2 wherein the season is at least one of a twelve-month period, a 365-day period; a nine-month period, a 270-day period; a six month period, a 180-day period; a three-month period and a 90-day period.

4. The non-transitory computer readable storage medium of claim 2 wherein the automated webbased platform divides the season into predefined sub periods for at least one of a playoff format and awarding supplementary awards.

5. The non-transitory computer readable storage medium of claim 2 wherein each league begins its season on the first day of any month of the Gregorian calendar.

6. The non-transitory computer readable storage medium of claim 1 wherein the predefined method of victory for leagues participating in a total-points format is such that the team within each league that scores a highest total of fantasy points over the course of the predefined course of time is determined the winner of that league.

7. The non-transitory computer readable storage medium of claim 1 wherein the predefined method of victory for leagues participating in a playoff format is such that the team within each league having the most points during a defined playoff sub period of the finite time-period season is determined the winner of that league.

8. The non-transitory computer readable storage medium of claim 7 wherein the predefined course of time is four consecutive calendar quarters, with the fourth quarter being defined as the playoff sub period.

9. The non-transitory computer readable storage medium of claim 8 wherein teams having a highest point total during each of the first three quarters advance to a playoff pool that competes during the playoff sub period.

10. The non-transitory computer readable storage medium of claim 9 wherein further playoff pool qualifications are determined by the highest total points scored by each team during the combined first three quarters of the season.

11. The non-transitory computer readable storage medium of claim 1 wherein the plurality of participants may be restricted from dropping fighters on their fantasy teams for a predefined period of time after acquisition.

12. The non-transitory computer readable storage medium of claim 11 wherein the plurality of participants may be restricted from dropping fighters on their fantasy teams for a period of approximately 90-days following acquisition.

13. The non-transitory computer readable storage medium of claim 11 wherein at least one designated roster spot on each fantasy team may be exempt from drop restrictions.

14. The non-transitory computer readable storage medium of claim 13, wherein the point scoring by the exempted roster spot is systematically cut in half.

15. The non-transitory computer readable storage medium of claim 13 wherein the point scoring by said exempted roster spot is systematically reduced by one of any amount, percentage and nominal, relative to other non-exempt roster spots.

16. The non-transitory computer readable storage medium of claim 1 wherein the plurality of participants may be limited in the number times they can add or drop fighters from teams.

17. The non-transitory computer readable storage medium of claim 1 wherein the plurality of participants may be limited in the quantity of fights in which scoring occurs for their teams.

18. The non-transitory computer readable storage medium of claim 1 wherein fighters on respective fantasy teams may be awarded a cascading card appearance bonus comprising:

a sliding scale with the most points awarded to a main event fight at the top of the card then decreasing by a margin the amount of points awarded for fights below the main event fight.

19. The non-transitory computer readable storage medium of claim 18 wherein said margin of decrease in bonus points awarded is an equal amount or percentage for every fight below the main event fight.

20. The non-transitory computer readable storage medium of claim 19 wherein said margin of decrease is one point for each additional fight below the main event on the card.

21. The non-transitory computer readable storage medium of claim 18 wherein said bonus is awarded starting at one of the group consisting integers between five and ten points for the main event fight.

22. The non-transitory computer readable storage medium of claim 1 wherein the plurality of participants may move fighters to a reserve roster, wherein the scoring during MMA fights for fighters on the reserve roster is subject to at least one of discount and invalidation.

23. The non-transitory computer readable storage medium of claim 22 wherein fighters may not be moved to the reserve roster unless they have been held for at least one of: six months and an approximation of six months such as 180 days.

24. The non-transitory computer readable storage medium of claim 1 wherein each fighter on a fantasy team is awarded a bonus for being rostered at the end of the predefined course of time.

25. The non-transitory computer readable storage medium of claim 24 wherein said bonus is equal to the fighter's average score.

26. The non-transitory computer readable storage medium of claim 1 wherein fighters on fantasy teams are awarded additional points when fighting for a championship in a real-world MMA event.

27. The non-transitory computer readable storage medium of claim 1 wherein fighters are awarded points differentiated by which real-world promotional organization is conducting the fight card.

28. The non-transitory computer readable storage medium of claim 1 wherein fighters are awarded points differentiated by television broadcast type.

29. The non-transitory computer readable storage medium of claim 28 wherein fighters are awarded a 10-to-1 cascading card bonus for a pay-per-view broadcasted fight card and anything less than 10 points and down in a cascading card bonus for a non-pay-per-view fight card.

30. The non-transitory computer readable storage medium of claim 1 wherein fighters are awarded points differentiated by the weight class in which they compete.

31. The non-transitory computer readable storage medium of claim 1 wherein fighters are awarded points differentiated by the way a fight ends selected from one or more of the group comprising: knockout, technical knockout, submission, unanimous decision, majority decision, split decision, draw, no contest, or doctor stoppage.

32. The non-transitory computer readable storage medium of claim 31 wherein submissions are further differentiated into exact submission type selecting from the group comprising all realworld mixed-market-arts submissions, including rear-naked choke, triangle choke, guillotine choke, gogoplata, arm triangle, arm bar, kimura, americana, omoplata, knee bar, ankle lock, heel hook, and leg lock.

33. The non-transitory computer readable storage medium of claim 1 wherein fighters on fantasy teams are awarded points differentiated by the round in which a fight ends.

34. The non-transitory computer readable storage medium of claim 33 wherein the winner of a fight is awarded at least one of: an additional three points for finishing in round one, two points for round two, and one point for round three.

35. The non-transitory computer readable storage medium of claim 1 wherein the league homepage includes a my team link to a webpage comprising a roster of the fighters on a participant's fantasy team with scoring details from the inception of the participant's league.

36. The non-transitory computer readable storage medium of claim 1 wherein a link to fighters in the league homepage allows the plurality of participants to access a fighters page giving details of real world MMA fighters with availability and weight classes.

37. The non-transitory computer readable storage medium of claim 1 wherein the plurality of participants can click on a fighter's name in the list of fighters and the plurality of participants navigate to a respective individual fighter page devoted to the respective fighter.

38. The non-transitory computer readable storage medium of claim 37, wherein the fighter page includes at least one of: proprietary analysis, recent news about fantasy status, scheduled MMA events of the fighter, vital statistics and fight results history.

39. The non-transitory computer readable storage medium of claim 1 wherein the league homepage contains a link to results, which allows the plurality of participants to access a results page giving details of results of all applicable MMA fights events that have occurred since the league inception, along with a detailed breakdown of fighter scoring during each MMA fight event.

40. The non-transitory computer readable storage medium of claim 1 wherein the league homepage contains a link to upcoming events, which allows the plurality of participants to access an upcoming events page describing the upcoming events with event information.

41. The non-transitory computer readable storage medium of claim 1 wherein automated processing of MMA fantasy fighter game functionality is provided to include at least one of: adds, drops, trades, grudge matches, fighter contracts and drop restrictions.

42. The non-transitory computer readable storage medium of claim 1 wherein the automated webbased platform allows a participant the opportunity to challenge another participant within a league to a grudge match whenever two fighters on their respective fantasy teams are scheduled to fight one another during an upcoming MMA fight event, wherein the winner scores extra points and the loser is penalized points relative to normal fantasy point scoring for the fight.

43. A non-transitory computer readable storage medium as defined in claim 1, wherein the method further comprises providing the Mixed Martial Arts (MMA) fantasy league to participants on a web-based platform.

44. In a computing environment comprising an online game service and a plurality of online game players playing a game at remote client computers that are connected to the game service, a method for establishing mixed martial arts (MMA) fantasy leagues to a plurality of participants utilizing an automated web-based platform, the method comprising the steps of:
   a) registering the plurality of participants into the automated web-based platform by entering requested information and creating a participant account;
   b) at least one of: matching the plurality of participants with other participants registered in the automated web-based platform to establish a plurality of fantasy public leagues and allowing participants to invite others to create fantasy private leagues;
   c) organizing the fantasy leagues in accordance with game rules, including scoring metrics based on MMA fight results or accomplishments; at least one of: holding period, transactional, transactional drop, and fight quantity restrictions; a predefined course of time; and a predefined method of victory;
   d) allowing the plurality of participants to draft from a pool of real world MMA fighters to create fantasy teams;

e) computing points scored by each fighter rostered on said fantasy teams based on real world statistical performances and accomplishments of the fighter during MMA matches;

f) comparing the total points of each fantasy team to each other at the end of the predefined course of time; and g) declaring the winner of the fantasy league as at least one of: the team having the most accumulated points during the predefined course of time and the team having the most accumulated points during a specific sub period of the predefined course of time.

45. In a computing environment comprising an online game service, a method for playing a mixed martial arts (MMA) fantasy game utilizing an automated web-based platform, the method comprising the steps of:

a) registering into the automated web-based platform by entering requested information and creating a participant account;

b) utilizing the automated system provided by the web-based platform to perform at least one of joining an existing MMA fantasy league within the web-based platform and creating a new private MMA fantasy league;

c) selecting fighters from real-world MMA fighters to comprise a fantasy team within said fantasy league;

d) competing said team with other fantasy teams within said league in accordance with game rules, including scoring metrics based on MMA fight results or accomplishments; at least one of: holding period, transactional add, transactional drop, and fight quantity restrictions; a predefined course of time; and a predefined method of victory;

e) managing said team over the predefined course of time including exercising at least one of adds, drops, trades, grudge matches, and contract exemptions;

f) accessing data provided by the web-based platform including points scored by each fighter rostered on said fantasy team based on real world statistical performances and accomplishments of the fighter during MMA matches;

g) winning the MMA fantasy game by having the most accumulated points during the predefined course of time or a specific sub period of the predefined course of time within said league.

* * * * *